United States Patent Office 2,957,020
Patented Oct. 18, 1960

2,957,020

METHOD OF PREPARING PHOSPHORUS CONTAINING INSECTICIDAL COMPOUNDS

Werner Perkow, Hamburg, Germany, assignor to C. F. Spiess & Sohn, Hamburg, Germany No Drawing. Filed June 23, 1958, Ser. No. 743,992

Claims priority, application Germany July 18, 1957

2 Claims. (Cl. 260—461)

The present invention relates to novel nitrogen and sulfur containing O,O-dialkyl esters of phosphoric and thiophosphoric acids having insecticidal properties. The novel compounds are of the following general formula:

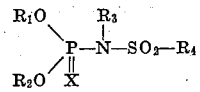

wherein $R_1$ and $R_2$ represent the same or different alkyl radicals containing 1 to 4 carbon atoms; $R_3$ represents an alkyl radical with 1 to 12 carbon atoms, cycloalkyl, a phenyl radical or a substituted phenyl radical; $R_4$ represents an alkyl radical with 1 to 12 carbon atoms, a halogenated alkyl radical containing 1 to 4 carbon atoms, a phenyl radical or a substituted phenyl radical; X represents oxygen or sulfur.

The novel compounds according to the invention can be prepared by one of the two following procedures which only differ in the sequence of the steps employed:

I. O,O-dialkyl phosphoric acid chloride or O,O-dialkyl thiophosphoric acid chloride is reacted with an aliphatic or aromatic primary amine and the resulting product is then reacted with an aliphatic or aromatic sulfonic acid chloride while splitting off HCl as indicated in the following equations:

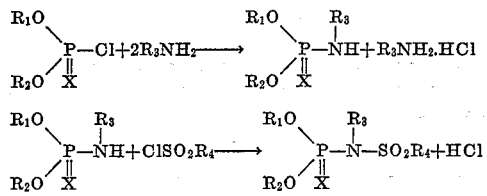

Tertiary amines or water free alkali metal carbonate can, for example, be employed as the acceptor for the HCl which is split off in the second step of the process. Of course, it is also possible to split off alkali metal halide instead of HCl by first reacting the ester amide of phosphoric acid produced in the first step with an alkali metal, such as sodium, to produce the N-alkali metal compound before the reaction with the sulfonic acid chloride according to the following equation:

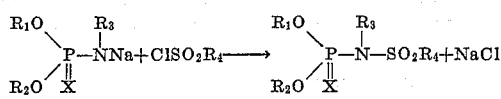

II. In this procedure the sequence of steps is altered in that the primary amine is first reacted with the sulfonic acid chloride and then the resulting sulfonic acid amide is then reacted with the dialkyl phosphoric acid chloride according to the following equations:

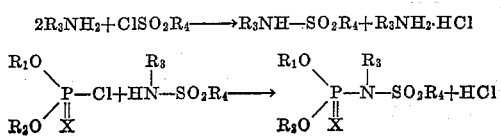

In this case also the splitting off of HCl in the second step can be replaced by splitting off an alkali metal halide by first reacting the sulfonamide with alkali metal to produce the corresponding alkali metal compound and then reacting this compound with the dialkyl phosphoric acid chloride according to the following equation:

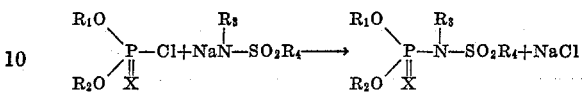

The above reactions are expediently carried out with the aid of an inert organic solvent, such as, for example, benzol, xylol, diethyl ether, carbon tetrachloride and the like. The reaction temperature employed for both procedures can be between —10° C. and the boiling point of the solvent employed and preferably is held between 0° and 130° C. It is not necessary to recover the reaction product from the first reaction step and the reaction solution obtained in the first step or, if desired, the filtrate therefrom can be employed for the second step.

The new compounds are soluble in the customary organic solvents and also to a certain extent soluble in water as long as $R_3$ is an aliphatic or cycloaliphatic radical and $R_4$ is an aliphatic radical.

The new compounds exhibit strong insecticidal properties which render them valuable as insecticides, particularly as agricultural insecticides. They are effective against sucking insects, such as aphids and spider mites, both as contact as well as systemic insecticides. The compounds are absorbed by the leaves and roots of plants sprayed or watered with compositions containing such compounds and are taken by the sap stream up to bud tips.

The following examples illustrate several embodiments of the invention:

*Example 1*

14.45 g. of dimethyl phosphoric acid chloride were dissolved in 50 cc. of dry benzol, and 11.8 g. of isopropyl amine dissolved in 20 cc. of benzol were added while stirring and cooling in an ice bath. Thereafter the reaction mixture was permitted to stand at room temperature for 6 hours and was then vacuum filtered to remove the almost quantitatively precipiated isopropyl amine hydrochloride (9.5 g.). The filtrate which contained a good yield of N-isopropyl amino phosphoric acid O,O-dimethyl ester (B.P. at 1 mm. Hg=107—109° C., M.P.=42° C.) was then employed directly without isolation of such dimethyl ester for reaction with methyl sulfochloride. For such reaction, 11.45 g. methyl sulfochloride were added to such filtrate and then 12 g. triethyl amine were added thereto dropwise with stirring while cooling with an ice water bath. The mixture was then permitted to stand overnight. After filtering off the precipitated triethyl amine hydrochloride with a vacuum filter, the solvent was distilled off under vacuum. An oily distillation residue (24 g.) remained which had the composition $C_6H_{16}O_5PNS$ which agrees with that of the O,O-dimethyl ester of N-isopropyl-N-sulfomethyl-amino phosphoric acid of the formula $$\begin{array}{c} CH_3O \\ \phantom{CH_3}\diagdown \\ \phantom{CH_3O\diagdown}P-N-SO_2-CH_3 \\ \phantom{CH_3}\diagup\phantom{\|} \\ CH_3O\phantom{\diagup}O \end{array} \quad \begin{array}{c} i-C_3H_7 \\ | \\ \\ \\ \end{array}$$

The ester can be vacuum distilled at a pressure of 0.5 mm. Hg at 100 to 102° C. However, slight decomposition occurred during such distillation.

0.5 g. of the compound were dissolved in 1 liter of water and such solution was used to water potted bean plants (*Vicia faba*) 20 cm. tall which were infected with aphids (*Doralis fabae*) at a rate of 50 cc. per pot. Six hours after such watering 90% of the aphids and after eight hours after such watering 100% of the aphids on the bean plants were killed, which showed that the insecticidal compound had been taken up by the roots of the plants and had been transported by the sap to the tips of the leaves.

The following compounds were prepared in an analogous manner and all were found to possess the same insecticidal properties as the compound of Example 1.

| | Boiling Point |
|---|---|
| $$\begin{array}{c}CH_3O\\ \diagdown\\ \phantom{CH_3O}P-N-SO_2-CH_3\\ \diagup\phantom{aa}\parallel\phantom{a}|\\ CH_3O\phantom{a}O\phantom{a}C_2H_5\end{array}$$ | 105–107° C., 0.8 mm. Hg. |
| $$\begin{array}{c}CH_3O\\ \diagdown\\ \phantom{CH_3O}P-N-SO_2-CH_3\\ \diagup\phantom{aa}\parallel\phantom{a}|\\ CH_3O\phantom{a}O\phantom{a}n-C_3H_7\end{array}$$ | 110–112° C., 0.8 mm. Hg. |
| $$\begin{array}{c}CH_3O\\ \diagdown\\ \phantom{CH_3O}P-N-SO_2-CH_3\\ \diagup\phantom{aa}\parallel\phantom{a}|\\ CH_3O\phantom{a}O\phantom{a}n-C_4H_9\end{array}$$ | 124–126° C., 0.8 mm. Hg. |
| $$\begin{array}{c}CH_3O\\ \diagdown\\ \phantom{CH_3O}P-N-SO_2-CH_3\\ \diagup\phantom{aa}\parallel\phantom{a}|\\ CH_3O\phantom{a}O\phantom{a}C_2H_5\end{array}$$ | 117–119° C., 1 mm. Hg. |
| $$\begin{array}{c}C_2H_5O\\ \diagdown\\ \phantom{C_2H_5O}P-N-SO_2-C_2H_5\\ \diagup\phantom{aa}\parallel\phantom{a}|\\ C_2H_5O\phantom{a}O\phantom{a}i-C_3H_7\end{array}$$ | 126–128° C., 1 mm. Hg with decomposition. |
| $$\begin{array}{c}i-C_3H_7O\\ \diagdown\\ \phantom{i-C_3H_7O}P-N-SO_2-n-C_6H_{11}\\ \diagup\phantom{aa}\parallel\phantom{a}|\\ i-C_3H_7O\phantom{a}O\phantom{a}C_2H_5\end{array}$$ | not distillable. |

Example 2

18.81 g. of diethyl thiophosphoryl chloride were dissolved in 50 cc. of benzol and 9.02 g. of ethyl amine were slowly added thereto while cooling the mixture in an ice water bath. Thereafter the reaction mixture was allowed to stand for 8 hours at room temperature and the precipitated ethyl amine hydrochloride filtered off on a vacuum filter. 13.8 g. of water free potassium carbonate and 16.30 g. of beta chloroethyl sulfochloride were added to the filtrate which contained the diethyl ester of N-ethyl-aminothiophosphoric acid (B.P. at 1 mm. Hg 126–128° C.) and the mixture refluxed with stirring for eight hours at the boiling point of the solvent (benzol). Thereafter the inorganic salts were filtered off and the benzol removed by evaporation under vacuum. About 32 g. of a medium brown oily residue remained which could not be distilled without decomposition and which had a density $D^{20}$ of about 1.185 and a refractive index $d_D^{20}$ of about 1.475. It had the expected composition $C_8H_{19}O_4NPS_2Cl$ of the diethyl ester of N-ethyl-N-sulfo-beta-chloroethyl-amino thiophosphoric acid of the formula

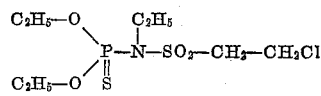

50 parts by weight of the resulting ester were mixed with 50 parts by weight of a non-ionic emulsifier (lauryl-hexaglycol ether) to produce a mixture dispersible in water. Sprays of aqueous dispersions with concentrations of 0.05% and less of the ester mixture were still 100% lethal against aphids (for example, *Mycus cerasi*) and mites (for example, *Metatetranychus ulmi*).

Example 3

A solution of the O,O-dimethyl ester of N-isopropyl amino phosphoric acid in benzol was produced as described in Example 1 and 11.2 g. of chloromethyl sulfochloride and 13.8 g. water free finely powdered potassium carbonate were added thereto and the mixture first stirred for three hours at room temperature and then for three hours under reflux at the boiling point of the benzol. The inorganic salts were then filtered off from the reaction mixture and the benzol then distilled off. A thin liquid non-distillable oil was obtained whose composition $C_6H_{15}O_5NSPCl$ corresponded to the expected formula

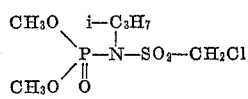

The insecticidal properties of this ester were identical with those of the product obtained in Example 1.

Example 4

14.45 g. of dimethyl phosphoric acid chloride were dissolved in 75 cc. of dry benzol and a slow stream of gaseous methyl amine was passed through this solution with vigorous stirring until no further methyl amine hydrochloride precipitated out. The precipitated salt was filtered off. 2.25 g. of finely divided sodium metal were added to the filtrate which contained the dimethyl ester of N-methyl-amino phosphoric acid (B.P. at 1 mm. Hg=102–104° C.) and the mixture refluxed with stirring until the metal dissolved. After cooling the mixture to room temperature, 12.81 g. of ethyl sulfochloride were added and the mixture permitted to stand overnight. To complete the reaction the mixture was then refluxed for two hours and the precipitated NaCl filtered off and the benzol distilled off under vacuum. About 21 g. of a thin liquid water soluble oil having a boiling point of 106–108° C. at 1 mm. Hg was obtained as the residue. The composition thereof corresponded to the formula

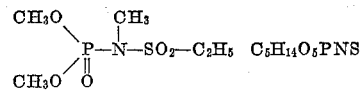

When aphids were sprayed with a 0.1% aqueous solution of this compound a 100% kill was achieved after a few hours.

Example 5

19.07 g. of p-tolyl sulfochloride were added to a benzol solution of N-isopropyl amino phosphoric acid O,O-dimethyl ester produced as in Example 1 and then 12.92 g. of quinoline were added dropwise at room temperature and the mixture allowed to stand overnight. Thereafter to complete the reaction the mixture was heated for two hours at 75° C. and the precipitated quinoline hydrochloride filtered off and the benzol distilled off under vacuum. About 32 g. of a viscous oil which could not be distilled without decomposition were obtained as a residue. The analytical composition $C_{12}H_{20}O_5NPS$ thereof corresponded to the expected formula

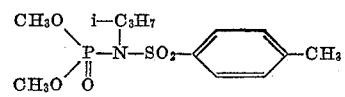

5 g. of the compound produced were dissolved in a mixture of 5 g. of monochlorobenzol and 5 g. of a non-ionic emulsifier (octyl phenyl-decaglycol ether). An aqueous emulsion containing 0.1% of this mixture when sprayed upon apple tree branches infected with red spider mites (*Paratetranychus pilosus*) produced a 100% kill (including their eggs) within 48 hours.

Example 6

18.81 g. diethyl thiophosphoryl chloride were dissolved in 75 cc. of carbon tetrachloride and 14.63 g. of n-butylamine were added thereto slowly while cooling in an ice water bath. After allowing the reaction mixture to stand overnight the precipitated n-butylamine-hydrochloride was filtered off. 21.11 g. of p-chlorophenyl sulfochloride were dissolved in the filtrate which contained the diethyl ester of N-n-butylaminothiophosphoric acid (B.P. 127–130° C. at 0.5 mm. Hg with decomposition) and thereafter 12 g. of triethylamine were slowly added with cooling with water. The reaction mixture was allowed to stand for 12 hours at room temperature and then was heated for four hours at 40° C. After cooling down the precipitated triethylamine hydrochloride was filtered off and the carbon tetrachloride was distilled off under vacuum. The residue was a viscous oil, which could not be distilled without decomposition, of the composition $C_{14}H_{23}O_4NS_2PCl$ which corresponded to the expected formula

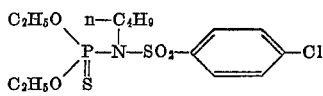

An 0.05% emulsion of the O,O-diethyl ester of N-n-butyl-N-p-chlorophenyl sulfonyl amino thiophosphoric acid produced was prepared as described in Example 2. When the cut ends of cut apple tree branches infested with aphids (*Aphis pomi*) were placed in such emulsion for a few hours all aphids were dead after four hours.

Example 7

14.45 g. of dimethyl phosphoric acid chloride were dissolved in 50 cc. of dry benzene and a solution of 25.51 g. of p-chloro aniline in 100 cc. of benzol was added thereto. The mixture was allowed to stand at room temperature for two hours and then heated for a further two hours under reflux on a water bath. After cooling down the almost quantitatively precipitated N-chloroaniline hydrochloride was filtered off. 11.45 g. of methyl sulfochloride were added to the filtrate which contained the dimethyl ester of N-p-chlorophenyl amino phosphoric acid (M.P. 100–102° C. recrystallized from carbon tetrachloride) and 12 g. triethyl amine were added dropwise while cooling on an ice bath. The reaction mixture was permitted to stand overnight at room temperature. After filtering off the precipitated triethyl amine hydrochloride, the solvent was distilled off under vacuum. The residue was the viscous oil (about 31 g.), which could not be distilled without decomposition, of the analytical composition $C_9H_{13}O_5NPSCl$ which corresponded to the formula

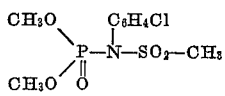

30 parts by weight of the oil were dissolved in 50 parts by weight of xylol and 20 parts by weight of a non-ionic emulsifier (lauryl hepta glycol ether) were added thereto. Aphids are killed within a few hours after being sprayed with an aqueous 0.2% emulsion of this mixture.

Example 8

When the procedure of Example 7 was repeated with the exception that 2,4-dichloro phenyl sulfochloride was employed instead of the methyl sulfochloride, a tough, nondistillable oil having insecticidal properties was obtained as the reaction product. Its analytical composition was $C_{14}H_{13}O_5NPSCl_2$ which corresponded to the formula

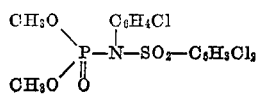

Example 9

11.8 g. of isopropyl amine were dissolved in 50 cc. of benzol and 11.45 g. of methyl sulfochloride was slowly added to such solution while cooling with an ice water bath. The isopropyl amine hydrochloride which precipitated was filtered off and then the benzol was distilled off under vacuum. The distillation residue was an almost quantitative yield of methyl sulfonic acid isopropylamide, $i-C_3H_7-NH-SO_2-CH_3$, which is distillable at 118–120° C. at 0.8 mm. Hg pressure and which melts at 34–35° C.

The methyl sulfonic acid isopropylamide produced was added to 100 cc. of xylol containing 2.25 g. of suspended sodium metal and the mixture first heated for two hours to 100° C. with vigorous stirring and then for a further two hours at the boiling point of the solution. During such heat treatment the sodium metal dissolved and a portion of the N-alkali metal compound produced precipitated out. After the mixture cooled to 50° C., 14 g. of dimethyl phosphoric acid chloride were added thereto and the mixture heated up to the boiling point of the xylol in six hours. After cooling off the reaction mixture the sodium chloride produced was filtered off and the xylol distilled off under vacuum. 18 g. of an oil were obtained as the distillation residue which in its physical, chemical and biological properties was identical with the product of Example 1.

In an analogous manner other amides of methyl sulfonic acid, for example:

| | B.P. ° C. |
|---|---|
| Methyl sulfonic acid ethyl amide | 115–117 at 0.5 mm. Hg. |
| Methyl sulfonic acid n-propyl amide | 130–132 at 1.0 mm. Hg. |
| Methyl sulfonic acid n-butyl amide | 140–143 at 0.8 mm. Hg. |
| Methyl sulfonic acid cyclohexyl amide | 160–162 at 1.0 mm. Hg. | can be reacted with O,O-dialkyl phosphoric acid chlorides or O,O-dialkyl thiophosphoric acid chlorides either in the form of their N-alkali metal compounds, as described above, or as such with splitting off of HCl with the aid of alkali metal carbonates as described in Examples 2 and 3.

I claim:

1. A method of producing a compound of the formula

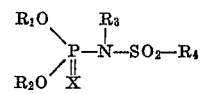

wherein $R_1$ and $R_2$ each represent an alkyl radical containing 1 to 4 carbon atoms, X represents an atom selected from the group consisting of oxygen and sulfur atoms, $R_3$ represents an alkyl radical containing 1 to 12 carbon atoms, the cyclohexyl radical, the phenyl radical and mono- and dichloro substituted phenyl radicals and $R_4$ represents an alkyl radical containing 1 to 12 carbon atoms, monochloro substituted alkyl radicals containing 1 to 4 carbon atoms, the phenyl radical and mono- and dichloro substituted phenyl radicals which comprises reacting an amine of the formula $R_3NH_2$ wherein $R_3$ has the same significance as above with one acid halide selected from the group consisting of

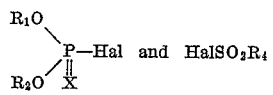

wherein Hal represents halogen and X, $R_1$, $R_2$ and $R_4$ have the same significance as above to replace the Hal by the radical $R_3NH-$ and then reacting the reaction product with the other of such acid halides.

2. A method of producing a compound of the formula

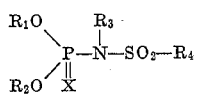

wherein $R_1$ and $R_2$ each represent an alkyl radical containing 1 to 4 carbon atoms, X represents an atom selected from the group consisting of oxygen and sulfur atoms, $R_3$ represents an alkyl radical containing 1 to 12 carbon atoms, the cyclohexyl radical, the phenyl radical and mono- and dichloro substituted phenyl radicals and $R_4$ represents an alkyl radical containing 1 to 12 carbon atoms, monochloro substituted alkyl radicals containing 1 to 4 carbon atoms, the phenyl radical and mono- and dichloro substituted phenyl radicals which comprises reacting an amine of the formula $R_3NH_2$ wherein $R_3$ has the same significance as above with one acid halide selected from the group consisting of

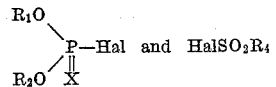

wherein Hal represents halogen and X, $R_1$, $R_2$ and $R_4$ have the same significance as above to replace the Hal by the radical $R_3NH-$, reacting the reaction product with an alkali metal to form the N-alkali metal compound thereof and then reacting the N-alkali metal compound with the other of such acid halides.

References Cited in the file of this patent

Kirsanov et al.: Chemical Abstracts 49, 6164 (1955).
Kirsanov et al.: Chemical Abstracts 49, 8168 (1955).

UNITED STATES PATENT OFFICE
CERTIFICATION OF CORRECTION

Patent No. 2,957,020                         October 18, 1960

Werner Perkow

It is hereby certified that error appears in the above numbered patent requiring correction and that the said Letters Patent should read as corrected below.

In the grant, lines 1 and 2, for "assignor to C. F. Spiess & Sohn, of Hamburg, Germany," read -- assignor to C. F. Spiess & Sohn, of Kleinkarlbach, Germany, and Norddeutsche Affinerie, of Hamburg, Germany, --; line 11, for "C. F. Spiess & Sohn, their heirs" read -- C. F. Spiess & Sohn, their heirs or assigns, and Norddeutsche Affinerie, its successors --; in the heading to the printed specification lines 4 and 5, for "assignor to C. F. Spiess & Sohn, Hamburg, Germany" read -- assignor to C. F. Spiess & Sohn, Kleinkarlbac Germany, and Norddeutsche Affinerie, Hamburg, Germany --.

Signed and sealed this 6th day of June 1961.

(SEAL)
Attest:

ERNEST W. SWIDER
Attesting Officer

DAVID L. LADD
Commissioner of Patents